United States Patent [19]

Shepard et al.

[11] Patent Number: 5,136,383
[45] Date of Patent: Aug. 4, 1992

[54] HARDWARE INTERFACE FOR HIGH SPEED VIDEO IMAGING

[75] Inventors: Steven M. Shepard, Southfield; David T. Sass, Fair Haven, both of Mich.

[73] Assignee: The United States of America as represented by the Secretary of the Army, Washington, D.C.

[21] Appl. No.: 676,669

[22] Filed: Mar. 28, 1991

[51] Int. Cl.$^5$ .................. H04N 7/04; H04N 5/14; H04N 5/33
[52] U.S. Cl. .................. 358/148; 358/160; 358/93; 358/113; 358/208; 358/108; 358/107
[58] Field of Search .............. 358/160, 111, 110, 21 R, 358/113, 93, 148, 107, 209, 108, 208, 206, 225, 903, 213.13, 149, 153, 154, 158

[56] References Cited

U.S. PATENT DOCUMENTS

| | | | |
|---|---|---|---|
| 4,878,116 | 10/1989 | Thomas et al. | 358/160 |
| 4,969,735 | 11/1990 | Gilligan | 358/107 |
| 4,970,597 | 11/1990 | Shepard | 358/209 |
| 5,034,817 | 7/1991 | Everett, Jr. | 358/160 |

Primary Examiner—James J. Groody
Assistant Examiner—Safet Metjahic
Attorney, Agent, or Firm—Peter A. Taucher; David L. Kuhn

[57] ABSTRACT

The invention is synchronization hardware for assisting the processing of video signals in a high speed imaging system, the hardware having logic circuitry for selecting acceptable pictoral units from within frames of a video signal. The synchronization hardware also has circuits for electronically coordinating a camera, a frame grabber, a host computer for the frame grabber and a flagging signal generator.

14 Claims, 3 Drawing Sheets

HARDWARE INTERFACE FOR HIGH SPEED VIDEO IMAGING

GOVERNMENT INTEREST

The invention described herein may be manufactured, used, and licensed by or for the U.S. Government for governmental purposes without payment to me of any royalty thereon.

BACKGROUND AND SUMMARY

The invention relates to electronic hardware used to produce an image of a recurring high speed event with a standard video camera. An imaging method using a standard video camera is described in U.S. Pat. No. 4,970,597 to Shepard. In the Shepard method the camera executes raster patterns wherein the camera repeatedly and sequentially scans a series of parallel horizontal lines which comprise an image field, and generates a video signal comprised of signals representing these lines. The camera continuously views the recurring event and, independently, a flagging signal is generated before each recurrence of the event. Within a complete image field, one or more of the recurring events may begin during an aperture signal that occurs once per line signal. When a recurrence of the event begins during an aperture signal, the line then being scanned will accurately represent a portion of the event. Signals or data representing these accurate or synchronized lines are collected and stored in a computer memory.

The Shepard method uses a frame grabber, which can save and transfer frames or parts of frames to a host computer. The method also uses synchronization hardware to control the frame grabber in response to the flagging signals and signals from the camera. The invention herein is a design for this synchronization hardware. It should be noted that the Shepard patent describes the imaging method for which the synchronization hardware disclosed herein is designed.

The Shepard method uses a commercially available infrared imaging camera having RS-170 video output. The raster pattern of the camera is traced by two sinusoidally driven scanning mirrors, one driven vertically and one driven horizontally. The vertical scanning mirror is driven at a frequency of 60 Hz and the horizontal scanning mirror is driven at a frequency of 4 kHz. The vertical mirror frequency is appropriate for generating a video signal, but the horizontal mirror frequency is one fourth as fast as is required for RS-170 video output.

The camera has two features to remedy the lack of sufficient speed of the horizontal scanning mirror. First, the camera accepts input from the horizontal scanning mirror during both the forward and reverse passes. The camera digitizes the data it receives from the horizontal mirror on the reverse passes. Since the camera receives this data in reverse order, the camera again reverses the data to put this data in proper, "forward scan" order. The digitizing of information on the reverse passes increases the effective frequency of the horizontal mirror but also decreases the accuracy of this information when rapidly changing events are viewed.

The second feature increasing the effective frequency of the horizontal scanning mirror is the output of each scanned line in duplicate. Thus, if the first horizontal line of the camera's raster pattern output is a forward scanned horizontal line, then the second line of the camera's raster pattern output is a copy of the first line. The third line of the camera's raster pattern output will be a reverse scanned output and the fourth line will be a copy of the reverse scanned third line. The raster pattern output from the camera will be repetitions of the sequence of the four lines just described.

It may be desirable in some cases to utilize only data from all forward scanned lines, or only from all reverse scanned lines, or perhaps from both forward and reverse scan lines of the camera raster pattern. To accomplish this, signals generated by the motion of the horizontal scanning mirror are monitored. The synchronization hardware described herein is capable of receiving these signals. The synchronization hardware has circuitry to exert part of its control over the frame grabber in response to these signals. The synchronization hardware can be manually adjusted so that frame grabber accepts only forward scan lines, both forward and reverse scan lines, or only reverse scan lines.

DETAILED DESCRIPTION

Figure 1:
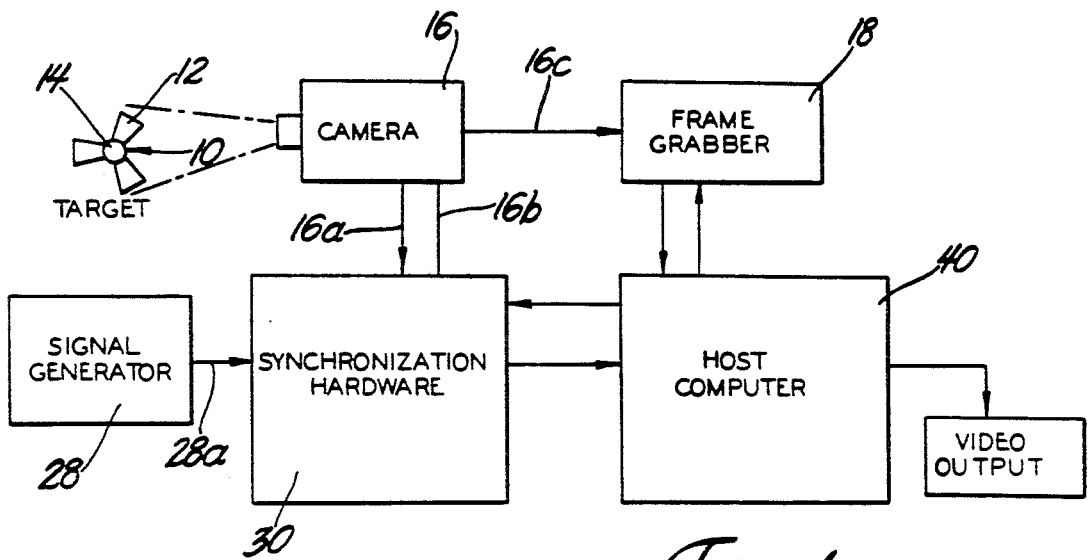
FIG. 1 is a schematic representation of the various items of hardware used in the Shepard method.

In FIG. 1, is a target 10 where a rapidly repeating event occurs. The event can be the rotation of a fan blade 12 on shaft 14 as shown in FIG. 1. A video camera 16 continuously scans the target and sends video signals representing the camera's raster patterns, or frames, to frame grabber 18. The camera can include sinusoidally driven, vertically and horizontally oscillated mirrors. The mirrors cooperate to scan an object plane and produce a raster pattern on the camera's image plane. The video signal of camera 16 is shown at 20 in FIG. 2. Signal 20 has a subcomponent, blanking signal 22, which is a stepped notch occurring between each frame. The frames themselves are comprised of signals 26 separated by square blanking pulses 24. The signals 26 each represent an individual horizontal line in the raster pattern of camera 16 but can represent other kinds of pictoral units within a frame.

Figure 2:
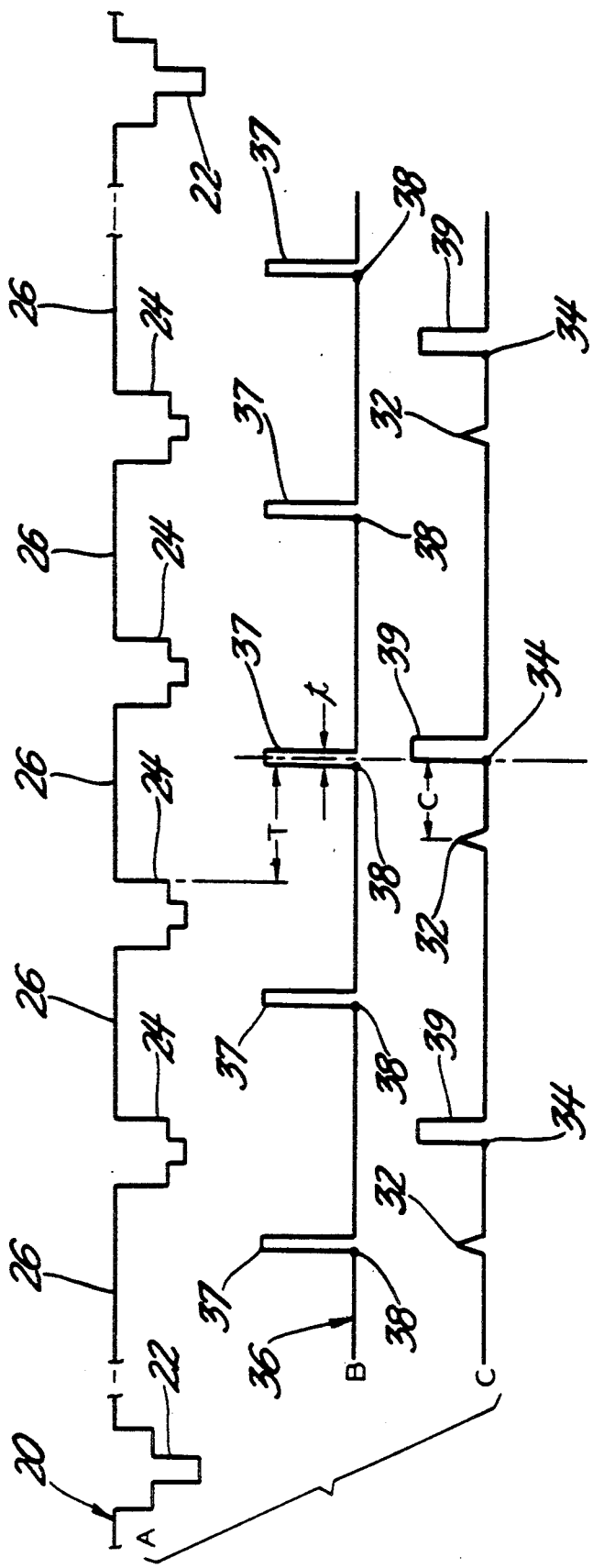
FIG. 2 is a graphic representation of a video signal, an aperture signal synchronized to the line signals of the camera video signal, and a recurring event to be imaged.

Signal generator 28 outputs a flagging signal at a known time interval before the event to be imaged occurs. When a moving fan blade was the target to be imaged, the signal generator included a light sending a beam across the path of the fan blade to a receptor. The receptor sent the flagging signal each time the targeted blade interrupted the beam, the receptor signal occurring at a fixed interval before the targeted blade reached the position where it was viewed by the camera. The flagging signal is represented at 32 in FIG. 2 and is shown occurring a constant time "c" before onset 34 of the targeted event. The targeted event itself is represented in FIG. 2 as rectangular signal element 39.

FIG. 1 shows synchronization hardware 30 which receives signals 20 and 32 (FIG. 2) respectively from camera 16 and signal generator 28. Synchronization hardware 30 generates a periodic aperture signal 36 having signal points or nodes 38 at regular intervals on rectangular signal elements 37. Aperture signal 36 is synchronized with video signal 20 so that the onset of a predetermined time span "t" occurs a constant time T after the onset of a line signal 26. The synchronization hardware has built-in logic to determine whether an onset 34 of an event occurs within the predetermined time span t. In FIG. 2, the onset 34 of one particular event 39 is shown as occurring within the predetermined time span t. One may view the synchronization hardware as determining whether the time of flagging signal 32 plus time "c" is acceptably close to the occurrence of the node 38.

At the same time that synchronization hardware 30 searches for event onsets 34 within predetermined time t, the synchronization hardware is also assigning sequential numbers to line signals 26 from camera 16. Synchronization hardware 30 records in a register and sends to frame grabber 18 the numbers of any "good" line signals 26, which are line signals occurring when a match is found between a node 38 and an event 34. These good line numbers are later transferred to the host computer 40 from frame grabber 18 along with good lines signals 26 associated with the numbers.

Figure 3:
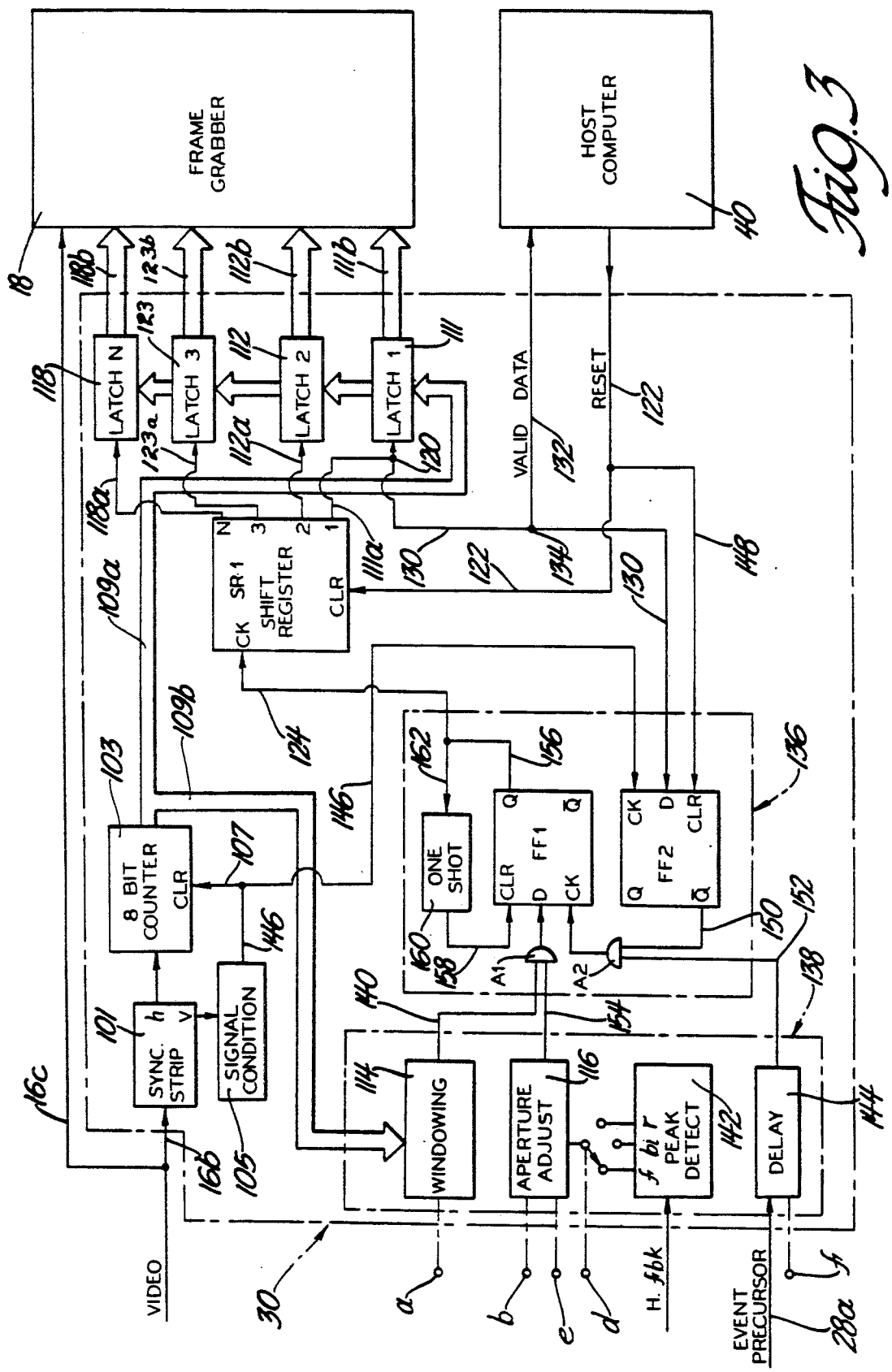
FIG. 3 is a schematic representation of the circuitry in the synchronization hardware.

FIG. 3 is a schematic representation of the circuitry of synchronization hardware 30 and the connections this circuitry has with signal generator 28, camera 16, frame grabber 18 and host computer 40. The video signal 20 (FIG. 2) from camera 16 enters synchronization hardware 30 via line 16b and this signal is accepted by sync strip circuit 101. Video signal 20 also goes to frame grabber 18.

The function of sync strip circuit 101 is to separate video signal into "horizontal" and "vertical" subcomponents. The horizontal subcomponents correspond to horizontal line signals 26 of FIG. 2 and the vertical subcomponents are frame separators. The vertical subcomponents are deemed "vertical" because they (as well as blanking signals 22) are analogs to the vertical retrace movement of the camera. This retrace movement occurs immediately after the camera finishes the bottom horizontal line in a frame and before the camera begins the top horizontal line of the next succeeding frame. The vertical subcomponents signify the end of one frame and the beginning of a new frame.

The horizontal subcomponents are sent to 8-bit counter 103 and the vertical subcomponents are sent to signal condition circuit 105. Signal condition circuit 105 lengthens the pulse width of the vertical subcomponents and adjusts the phase relation between a vertical subcomponent and the leading edge of the first horizontal subcomponent of a frame. There is one vertical subcomponent per frame and a multiplicity of horizontal subcomponents per frame.

8-bit counter 103 assigns sequential line numbers to the horizontal subcomponents it receives in the frame. The effect of this operation is to count and number the horizontal lines in each field output from camera 16. 8-bit Counter 103 can count up to 256 lines, but the number of bits of counter 103 can be adjusted to track a greater or lesser amount of lines or pictoral units per frame. Counter 103 outputs signals that represent the sequential line numbers of the horizontal lines of each frame. These signals travel along line 109b to windowing circuit 114 and along line 109a to a series of latches shown at 111, 112 and 118. The signal conditioner's output travels on lines 146 and 107 to restart counter 103 at zero when a new frame starts.

The latches control which horizontal lines of each frame will be selected and held by frame grabber 18.

The latches will "latch" or hold the sequential numbers of good lines and will cause frame grabber 18 to retain these good lines in memory. Synchronization hardware 30 allows the latches to retain line numbers from only one frame at a time. When a new frame begins, and line numbers are in any of the latches, then synchronization hardware 30 stops the latches from collecting further line numbers. The latches remain stopped while host computer 40 receives and stores the line numbers transferred to frame grabber 18 from the latches. The stoppage of the latches lasts until the host computer stores line signals 26 from the frame grabber that are associated with the line numbers. Host computer 40 sends a reset signal along line 122 once it has stored the data. Shift register SR1 receives this reset signal and clears the latches, so that the latches will accept more line numbers.

Figure 4:
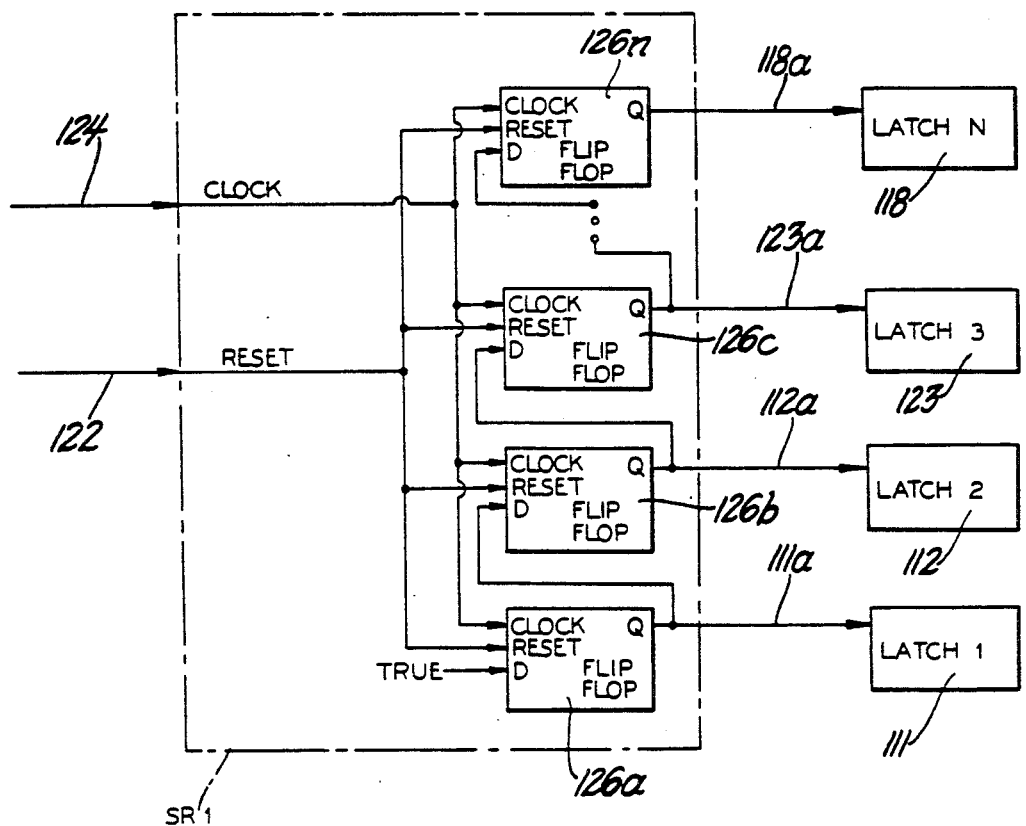
FIG. 4 is a detail of a shift register within the synchronization hardware circuitry.

Turning now to FIGS. 3 and 4, shift register SR1 controls the latches by sending signals through lines 111a, 112a, 123a and 118a to latches 111, 112, 123 and 118 respectively. When the first good line of a frame occurs, shift register SR1 receives a clock or other logic signal through line 124, whereupon it sends a signal on line 111a to activate latch 111. In response, latch 111 retains the sequential line number currently supplied to it from counter 103 through line 109a. Latch 111 sends this line number to frame grabber 18, which can be instructed to hold any or all the lines of a given frame. Frame grabber 18 keeps in its memory the line number and the horizontal line signal 26 (FIG. 2) associated with the line number. Latch 111 will accept no more line numbers until it receives a "clear" signal from shift register SR1. When shift register SR1 receives another clock signal, latch 112 is activated to retain the current sequential number from counter 103. Latch 112 sends this line number to frame grabber 18, and accepts no further line numbers during the frame. In the same fashion, shift register SR1 continues to sequentially activate latches in response to clock signals until either: a) the nth latch, latch 118 is activated to retain a line number and send the line number to frame grabber 18 or b) shift register SR1 receives a reset signal and in turn resets the latches.

FIG. 4 shows more detail of shift register SR1, the input line 109a being omitted for convenience. A clock pulse enters shift register SR1 through line 124 whenever a good line 26 is found. This clock pulse then enters the CK or clock inputs of a series of flip-flops 126a, 126b, 126c . . . 126n. The flip-flops actuate associated latches 1 through n shown at 111, 112, 123 and 118 respectively. Reset signals from the host computer enter the shift register on line 122 and actuate the reset mechanisms of flip-flops 126a through 126n. Each of the FIG. 4 flip-flops also has a D logic input and each flip-flop will output a high or true logic signal "Q" if a clock pulse is received when its D input is high. The Q logic signal continues from the flip-flop even after the clock pulse has passed and will continue until the flip-flop receives a reset signal.

The first flip-flop, 126a, has its D input permanently set at a "true" status. Thus, when flip-flop 126a receives a clock input pulse, then flip-flop 126a generates the logic signal Q. Signal Q is sent to the first latch 111 and also to the D input of the next succeeding flip-flop 126b. When the D logic input of flip-flop 126b receives the Q signal from flip-flop 126a, the D logic input of flip-flop 126b goes to a high state. When another clock pulse enters shift register SR1, flip-flop 126b will generate a Q logic signal as a result of receiving a clock pulse when its D input is in a high state. The Q logic signal of flip-flop 126b will activate second latch 112 and put the D input of flip-flop 126c at a high state. As clock signals continue to enter the flip-flops, successive flip-flops generate Q logic signals to activate an associated latch. This process continues until either flip-flop 126n activates the nth latch 118 or until a reset signal returns the flip-flops to their original state, where no clock signal had yet been received.

As seen in FIG. 3, shift register SR1 sends logic signals to host computer 40 along a route consisting of lines 111a, 130, and 132. Line 130 stems from junction 120 in line 111a, by which shift register SR1 controls the first latch, 111b. Line 132, which leads to host computer 40, tees off of line 130 at junction 134. The signal by which the shift register activates the first latch is thus the logic signal sent to the host computer, whereby the host computer is alerted to the existence of valid data whenever the first latch is activated. Host computer 40 sends reset signals to shift register SR1 after the host computer has received and stored valid data from frame grabber 18. As can be seen from prior discussion, the reset signal has the effect of reinitializing the shift register and the latches so that they restart the process of latching good line numbers and sending these line numbers to frame grabber 18.

The remainder of synchronization hardware may be regarded as being comprised of two major subcomponents, line selection logic circuit 138 and logic nucleus or circuitry 136. Within selection circuit 138 is windowing circuit 114, which receives line number data from counter 103 along line 109b. Windowing circuit 114 has a range of preselected line numbers against which it compares line numbers incoming from line 109b. If the incoming line number matches a preselected line number, then windowing circuit will output a high or true logic signal on line 140. Otherwise, windowing circuit will output a low or false signal along line 140. At "a" is a schematic representation for the manual control mechanism by which the set of preselected line numbers is chosen. By means of control mechanism "a", the user of synchronization hardware 30 can select a pair of line numbers and the hardware will accept all good lines between these line numbers. In summary, windowing circuit 114 outputs a high signal when horizontal line signals 26 (FIG. 2) fall within a targeted window or area of interest within the frame.

Line selection circuit 138 also has aperture adjust circuit 116 by which the location and width of square wave elements 37 of aperture signal 36 can be controlled. Manual control mechanism "b" controls the width dimension t in FIG. 2 and manual control mechanism "e" controls the distance T in FIG. 2. T is the phase differential between the wave forms represented by signals 20 and 36.

Feeding into aperture adjust circuit 116 is peak detect circuit 142, which responds to a horizontal feedback signal from camera 16 sent along line 16a. For the camera used by the inventors herein, a horizontal feedback signal is in the form of a sine wave representing the camera's horizontal scanning action. It is believed that an equivalent signal can be generated for any camera one chooses to use. Peak detect circuit 142 detects the occurrence of each horizontal line scan. The camera used by the inventors had forward horizontal scan lines and reverse horizontal scan lines in its raster pattern. Peak detect circuit 142 has a manual control mechanism "d" by which the circuit can be made to respond only to forward scan lines, to both forward and reverse scan lines, or only to reverse scan lines. The corresponding outputs from peak detect circuit 142 are at "f", "bi" and "r" respectively.

Selection circuit 138 includes delay circuit 144, which receives an event precursor signal such as flagging signal 32 in FIG. 2. Delay circuit 144 retards the event precursor signal for time "c" in FIG. 2. A manual control mechanism "f" allows a user to adjust the length of time span "c" so that "c" ends as the event begins at 34 in FIG. 2.

Logic nucleus 136 includes a flip-flop FF2, the clock or CK logic input of which receives the conditioned vertical subcomponents from signal conditioner 105 along line 146. Flip-flop FF2 also receives output from flip flop 126a (FIG. 4) along lines 111a and 130 so that a Q output from flip-flop 126a latches the D logic input of flip-flop FF2 in a high or true logic state. As noted above, the Q signal from flip-flop 126a causes a good line number to be latched and causes frame grabber 18 to hold the associated line signal 26. Thus the high state of the D logic input of flip-flop FF2 is an indication that frame grabber 18 has line data ready to transfer to host computer 40.

When host computer 40 sends a reset signal out on line 122, (FIG. 3) that signal is sent to flip-flop FF2 along line 148. The reset signal latches the D logic input of flip-flop FF2 to a low or "data not ready" state and latches the flip-flop's output to the "not Q" or "bar Q" logic condition shown in FIG. 3. Whenever flip-flop FF2 receives a conditioned vertical pulse signal along line 146 while its D logic input is in the high, data-ready state, then the logic output of flip-flop FF2 on line 150 is latched to a Q logic condition. This means that flip-flop FF2 will be latched to output a Q signal after two conditions coexist: 1) the ending of a frame and 2) data in the frame grabber ready for transfer to the host computer. Flip-flop FF2 will remain so latched until it receives a reset signal from the host computer. After flip-flop FF2 receives a reset signal, the output of flip-flop FF2 to line 150 remains latched at "not Q" until the concurrence of the two conditions enumerated above. Restated, these conditions are: 1) the flip-flop's receipt of a conditioned vertical signal indicating the end of a frame and 2) the flip-flop's D logic input being high (indicating that there are line data in the frame grabber ready for transfer). In short, flip-flop FF2 sends a "not Q" signal when frame grabber 18 is ready to accept line data and sends a Q signal when frame grabber 18 is not ready to accept line data.

Logic nucleus 136 contains a pair of AND gates, A1 and A2. AND gate A2 receives logic input on line 150 from flip-flop FF2, this input being either a Q or "not Q" signal. AND gate A2 also receives event signals 39 (FIG. 2) along line 152 from delay circuit 144. AND gate A2 outputs a high or true logic signal when it receives both a "not Q" signal from flip-flop FF2 and an event signal 39 from delay circuit 144. Consequently, AND gate A2 sends a "true" signal when frame grabber 18 is ready to accept data and an event to be imaged occurs. AND gate A1 receives logic inputs in the form of aperture signals 37 (FIG. 2) along line 154 and receives other logic signals along line 140 from widowing circuit 114. AND gate A1 sends a high or true logic signal when it receives a high output from both windowing circuit 114 and aperture adjust circuit 116. A high output from AND gate A1 means that an aperture signal 37 is occurring during a horizontal line signal 26 selected by the windowing circuit.

The D logic input of flip-flop FF1, which is normally latched at a low or false state, receives signals from AND gate A1. The clock or CK input CK flip-flop FF1 receives logic signals from AND gate A2. If the D logic input of flip-flop FF2 receives a high input from AND gate A1 at the same time the clock input of flip-flop FF1 receives a high signal from AND gate A2, then this D logic input is changed to a high state and latched there. If a high input is received only from AND gate A1, or only from AND gate A2, or from neither AND gate, then the D logic input of flip-flop FF1 remains at a low state. The high state of this D logic input means that four conditions have occurred simultaneously: 1) an aperture signal 37 has occurred, 2) the aperture signal has occurred within an area of interest (That is the aperture signal has occurred for a horizontal line selected by the windowing circuit.), 3) an event 39 has occured and 4) frame grabber 18 was ready to accept data. When the four conditions have occured (i.e., flip-flop FF1 receives high inputs from both AND gates), flip-flop FF1 outputs a Q signal to line 156; otherwise flip-flop FF1 outputs a "not Q" signal to line 156.

A Q signal on line 156 arrives at one-shot circuit 160 through line 162. One shot circuit 160 responds by sending a "clear" signal back to flip-flop FF1, whereby the D logic input of flip-flop FF1 returns to a low state and is latched there, and flip-flop FF1 discontinues outputting a Q signal. The effect of one-shot circuit 160 is to truncate Q signals from flip-flop FF1 so that they are short Q pulses. The Q pulses from flip-flop FF1 are sent along line 124 to the clock or CK input of shift register SR1. As explained previously, shift register SR1 uses the Q pulses to control n number of latches, which in turn govern the retention of particular, numbered line signals 26 by frame grabber 18.

We wish it to be understood that we do not desire to be limited to the exact details of construction shown and described herein since obvious modifications will occur to those skilled in the relevant arts without departing from the spirit and scope of the following claims.

We claim:

1. Synchronization hardware for an imaging system wherein the imaging system includes a camera whose video signal represents pictoral units grouped in frames and signal subcomponents separating the frames; the system further including a frame grabber receiving the video signal from the camera, a host computer communicating with the frame grabber, and a flagging signal generator communicating with the hardware; the synchronization hardware comprising:

counting circuitry receiving the video signal and counting the pictoral units within the frames, the counting circuitry assigning sequential numbers to the pictoral units;

the counting circuitry having restart means for reinitializing the counting circuitry at each occurrence of the signal subcomponents;

latch means for receiving the sequential numbers, latching selected sequential numbers and causing the frame grabber to save representations of pictoral units associated with the selected sequential numbers;

a set of latches within the latch means;

a shift register connected to and controlling the latches;

first logic circuitry sending a first logic signal when the frame grabber can accept the sequential numbers and the associated pictoral units, the first logic circuitry sending a second logic signal when the frame grabber can not accept the sequential numbers and the associated pictoral units; the first logic circuitry being connected to the counting circuitry, the shift register and the host computer; the first logic circuitry sending the first or second logic signal in response to inputs from the counting circuitry, the shift register and the host computer;

aperture adjust circuitry for converting feedback signals from the camera to an aperture signal occurring once per each pictoral unit, the aperture adjust circuitry including a manually operable means for adjusting the phase relation between the aperture signal and the video signal; the aperture adjust circuitry further including manually adjustable means for controlling width of the aperture signal;

outputting circuitry for outputting third logic signals in response to flagging signals, the outputting circuitry including manually operable means for controlling a time delay between receipt of one of the flagging signals and output of a corresponding second logic signal;

second logic circuitry connected to the first logic circuitry, the aperture adjust circuitry and the outputting circuitry; the second logic circuitry sending a pulse to the shift register at concurrence of one of the aperture signals, one of the third logic signals and one of the first logic signals.

2. The hardware of claim 1 wherein the second logic circuitry is comprised of:

a first AND gate receiving aperture signals from the aperture adjust circuitry;

a second AND gate receiving the third logic signals from the outputting circuitry and receiving first logic signals from the first logic circuitry;

a first flip-flop connected to the AND gates and receiving AND gate signals from the AND gates.

3. The hadware of claim 2 wherein the first flip flop is connected to and sends a control signal to the shift register and a one shot circuit, the one shot circuit having means to clear the first flip-flop so that the control signal is truncated to become a control pulse.

4. The hardware of claim 3 wherein the shift register is comprised of:

a series of cascaded flip-flops, each of the cascaded flip-flops being connected to one of the latches;

a first connector accepting reset signals from the host computer and sending the reset signals simultaneously to each of the cascaded flip-flops;

a second connector accepting control pulses from the second logic circuitry and sending the control pulses simultaneously to each of the cascaded flip-flops;

5. Hardware connecting components of an imaging system wherein the system includes a camera whose video signal represents pictoral units grouped in frames and signal subcomponents separating the frames; the system further including a frame grabber receiving the video signal, a computer communicating with the frame grabber, and a flagging signal generator communicating with the hardware; the hardware comprising:

counting circuitry receiving the video signal and counting the pictoral units within the frames;

a latch means for receiving count numbers from the counting circuitry, latching selected count numbers and causing the frame grabber to save pictoral units associated with the selected count numbers;

first logic circuitry sending a first logic signal when the frame grabber can accept the count numbers and the associated pictoral units, the first logic circuitry being connected to and responding to the counting circuitry, the latch means and the computer;

aperture adjust circuitry converting feedback signals from the camera to aperture signals, the aperture adjust circuitry including a manually operable means for adjusting the aperture signals;

outputting circuitry for outputting second logic signals in response to the flagging signals, the outputting circuitry including manually operable means for controlling a time delay between receipt of a flagging signal and output of a corresponding second logic signal;

second logic circuitry connected to the first logic circuitry, the aperture adjust circuitry and the outputting circuitry; the second logic circuitry sending a pulse to the circuit at concurrence of one of the aperture signals, one of the second logic signals and one of the first logic signals.

6. The hardware of claim 5 wherein the second logic circuitry is comprised of:
   a first AND gate receiving the aperture signals from the aperture adjust circuitry;
   a second AND gate receiving the second logic signals from the outputting circuitry and receiving first logic signals from the first logic circuitry;
   a first flip-flop connected to the AND gates and receiving AND gate signals from the AND gates.

7. The hardware of claim 6 wherein the latch means is a shift register controlling a series of latches.

8. The hardware of claim 7 wherein the first flip flop is connected to and sends a control signal to the shift register and a one shot circuit, the one shot circuit having means to clear the first flip-flop so that the control signal is truncated to become a control pulse.

9. The hardware of claim 8 wherein the shift register is comprised of:
   a series of cascaded flip-flops, each of the cascaded flip-flops being connected to one of the latches;
   a first connection accepting reset signals from the host computer and sending the reset signals simultaneously to each of the cascaded flip-flops;
   a second connection accepting control pulses from the second logic circuitry and sending the control pulses simultaneously to each of the cascaded flip-flops.

10. The hardware of claim 9 wherein the counting circuitry includes:
    a synch strip circuit separating the video signal into pictoral subcomponents and the signal subcomponents;
    a signal condition circuit processing the signal subcomponents; and
    a counter circuit receiving the pictoral subcomponents and processed signal subcomponents.

11. Hardware connecting components of a video system having a camera whose video signal represents pictoral units grouped in frames, a frame grabber, a computer connected to the frame grabber, and a signal generator connected to the hardware; the hardware comprising:
    counting circuitry counting the pictoral units within the frames;
    circuit means for receiving count numbers from the counting circuitry and sending selected count numbers to the frame grabber;
    first logic circuitry sending a first logic signal to the circuit when the frame grabber can accept the count numbers;
    an aperture adjusting circuit converting feedback signals from the camera to aperture signals;
    outputting circuitry outputting a second logic signal sending an output in response to a flagging signal from the signal generator, the outputting circuitry including an adjuster delaying response to the flagging signal;
    second logic circuitry connected to the first logic circuitry, the aperture adjusting circuitry and the outputting circuitry; the second logic circuitry sending a logic output to the circuit means at concurrence of one of the aperture signals, one of the second logic signals and one of the first logic signals.

12. The hardware of claim 11 wherein the adjuster is a manually variable means for controlling the delay in the response by the outputting circuitry to the flagging signal.

13. The hardware of claim 11 wherein the aperture circuitry includes means for controlling width of the aperture signal.

14. The hardware of claim 13 wherein the adjuster is a a manually variable means for controlling the delay in response of the outputting circuitry to the flagging signal.

* * * * *